July 4, 1967 J. H. BATCHELOR 3,329,189
JUICER FOR CITRUS FRUITS AND THE LIKE
Filed Jan. 6, 1965
5 Sheets-Sheet 1

FIG.1.

INVENTOR
JOHN H. BATCHELOR
By
W. H. Tarwell
Agent

Fig. 2.

INVENTOR.
JOHN H. BATCHELOR
BY
W. H. Maxwell
Agent

July 4, 1967  J. H. BATCHELOR  3,329,189
JUICER FOR CITRUS FRUITS AND THE LIKE
Filed Jan. 6, 1965                                     5 Sheets-Sheet 4

INVENTOR.
JOHN H. BATCHELOR
BY
Agent

United States Patent Office 3,329,189
Patented July 4, 1967

3,329,189
JUICER FOR CITRUS FRUITS AND THE LIKE
John H. Batchelor, Los Angeles, Calif., assignor to Roto Rico Co., Inc., Sabana Abajo, Carolina, Puerto Rico, a corporation of California
Filed Jan. 6, 1965, Ser. No. 423,686
15 Claims. (Cl. 146—3)

This invention relates to improvements in fruit juice extracting devices and is particularly concerned with citrus fruit juicers wherein each piece of fruit is cut in half and is carried by a pair of turrets into engagement with reamers, respectively, and by which action each piece of fruit is processed so as to yield a heavy juice without crushing the peel of the fruit. A general object of this invention is to provide the geometrical relationship of elements necessary in such a device, whereby a practical compact machine is the result.

Devices of the type under consideration are known as juicers, and heretofore such juicers have been rather large and cumbersome. Needless to say, large cumbersome devices are usually unnecessarily expensive and they are subject to limited use, not only because of the expense but since space does not always permit their installation, and also because of unsightliness. Therefore, features of such devices which heretofore have been considered necessary have been discarded and replaced by far simpler features which has inherently avoided complexity and structural failures characteristic of prior art devices and which has resulted in the compact, durable and very practical juicer hereinafter disclosed.

The type of juicer to which the present invention relates involves a pair of rotatable turret heads that are usually mounted for rotation on oppositely inclined axes. These inclined axes require that the reamers be widely separated while the fruit holders of the turret heads are brought close together at one rotative position, and with the result that the device is widened extensively. This widening of such devices has been used proposedly to advantage in the accommodation of a drive motor and transmission between the two turret heads. However, resort to providing such space for the accommodation of said drive motor and transmission has necessitated the inclination of the turret axes and all to the end that complexity and duplication of parts is the result. That is, independent drive shafting and bearings therefor has been required for each turret. Therefore, the present invention concerns itself with the improved geometric relationship of the juicer elements and with an improved transmission case cooperatively related to the said new and improved geometric relationship. In other words, the present invention is concerned with and has for its main objective a new and far simpler juicer of compact configuration, wherein inclined axes are eliminated, wherein fewer and simpler parts are required, particularly in order to drive the two turrets and two reamers from a centrally located drive motor.

An object of this invention is to provide a juicer, characterized by a knife that divides fruit into two halves which are each carried by a turret head into engagement with reamers, with turret heads that are co-axial, and with reamers that are on axes parallel with the common turret head axes.

An object of this invention is to provide a juicer of the character referred to and which has opposite turret heads to receive and to process the two separated halves of fruit, and wherein the halves of large as well as normal and small fruit are equally assured of proper engagement by holders associated with said turret heads.

Another object of this invention is to provide a space conserving transmission for a juicer of the type under consideration and which eliminates the usual requirement of inclined turret axes and which objectively permits such closeness of the two turrets on a common axis that the pieces of fruit divided by a centrally located knife are readily gripped by and effectively carried separately by said two turrets.

It is another object of this invention to minimize the number of shafts and bearings therefor, and to reduce the number of geared engagements, and further to utilize transmission means of high efficiency, whereby the motor can be of usual construction and effectively operable from any ordinary utility outlet (110 volt A.C.).

It is still another object of this invention to provide an improved cup assembly in a juicer of the type under consideration and which is quickly releasable and adapted to be removed for cleaning and reinstalled without interference from any other elements of the device, such as the reamers.

Still further, another object of this invention is to provide an improved juicer of the character referred to, in that the juice that is extracted is selectively finished as may be required and wherein the discharge of unwanted pulp and seed is automatic and requires virtually no special attention.

The various objects and features of this invention will be fully understood from the following detailed description of the typical preferred form and application thereof, throughout which description reference is made to the accompanying drawings in which:

FIG. 6a is a sectional view taken through the cam as indicated by line 6a—6a.

FIG. 8 is an enlarged detailed and fragmentary view taken as indicated by line 8—8 on FIG. 3 and showing the access door and press plate construction; and FIG. 9 is a view taken as indicated by line 9—9 on FIG. 8.

The improved and compact juicer of the present invention is a device adapted to be used on counter tops, in restaurants and the like, to extract juice from whole fruit and primarily from citrus fruit such as oranges. The sizes of fruit to be processed by the juicer can vary through a substantially wide range, it being understood that the fruit processed at any one time is more or less uniform in size, or within a selected predetermined range of size. Without delving into detail, it is known that freshly extracted juices are beneficial, and the advantages of a juicer that is as compact as possible, of sightly appearance, that is durable and sanitary, and which is efficient in operation is much to be desired, since these general features make it possible for a restauranteur to economically furnish his customers with freshly extracted fruit juices in a sanitary and expedient manner. With these generalities in mind, the present juicer is a relatively small device, when compared with prior art devices, that is intended to stand erect upon a table or counter top. However, smallness or compactness in no way adversely affects quantity or quality of production. Counter tops, for example, are of a standard depth, from front to back edge, with ample room for the depth of the present juicer. However, side space is at a premium at such a counter, and therefore it is highly advantageous to reduce the juicer to a minimum width. Therefore, and in accordance with this invention, the juicer involves, generally a narrow upstanding frame A, a pair of rotatable turrets B and one at each side of the frame A, one or more fruit holders C carried by each turret B and means D releasably coupling the fruit holders C to the turrets B respectively, knife means E and a control therefor to bisect whole fruit into like halves, a pair of rotatable reamers F and one associated with and in adjacent relation to each of said turrets B, means G controlling movements of the rotatable turrets B relative to the fruit holders C, juice finishing means H automatically operable to separate out the pulp and seed and dispose of the same, and a drive and transmission means M cooperatively operating the turrets B with the holders C, reamers F and finishing means H.

The narrow upstanding frame A is characteristic of this juicer, wherein there is a novel arrangement of rotational axes and relationship of turrets B and holders C associated therewith, with respect to the knife means E as well as to the reamers F. Also, the frame A is unique with respect to the relative positioning of the finishing means H and a disposal means 15 which is provided to eliminate peel from the juicer as it operates. Therefore, the frame A comprises two spaced and essentially flat and parallel walls 10 and 11 that are upstanding and joined by a transverse wall 12. The detailed construction of the frame can vary widely and includes, for example, features such as are clearly shown in the drawings and which accommodate bearings and supports for the means that are included as hereinafter described. Included in the frame A is a base 13 adapted to rest upon a support such as a a counter top and which is uniquely proportioned and disposed, being a narrow elongate base substantially square in cross-section so as to accommodate the diameter of a drive motor 14 and to accommodate the finishing means H in cooperative relationship to the peel disposal means 15. In accordance with the invention the walls 10–12 are centrally upstanding upon the base 13 establishing a housing with a chamber 16 common to the entire frame A and wherein the drive and transmission means M operates. The chamber 16 is consequently central and comprises closely spaced transverse walls 17 and 18 in the base 13, wall 17 providing support for the drive motor 14 that projects rearwardly on a horizontal and central axis, wall 18 providing support for the finishing means H and forward section of frame A which includes the disposal means 15. The frame A is characterized by its disposition about a central fore and aft and upstanding plane and by spaced bearing bosses 19 on the walls 10 and 11, said bosses being disposed on a common horizontal transverse axis spaced above the base 13.

In accordance with this invention the elongated base 13 has a centrally located juice, pulp and seed drop area and a forward section which underlies that portion of the machine from which the fruit peel is dropped after extraction of juice. The upper part of the base 13 is in the form of a pan 21 that receives the drop of juice, pulp, seed and peel, there being a funnel 22 directing juice, pulp and seed from the central area of the pan 21 to the juice finisher at one side of the base 13, and there being a chute 23 at the other side of the base 13 directing peel from the forward area of the pan 21 to discharge through and from the bottom of the frame A. Thus, the juice is retained for finishing and the peel is disposed of, it being a simple matter to provide means beneath the juicer, such as a garbage disposer for the elimination of peel discharge from the chute 23.

The pair of rotatable turrets B is provided for carrying at least one or more fruit holders at each opposite side of the frame A. To this end, and in accordance with the invention the turrets B are journaled on bearings 20 carried in the bosses 19 and on the common horizontal and transverse axis hereinabove described. As shown, there is a single turret shaft 25 centered in and rotatably carried by said bearings, said shaft 25 extending through the chamber 16 and projecting from the opposite side walls 10 and 11. The two turrets B are alike and each comprises a cup-shaped hub 26 rotatably journaled on the side wall of the frame A and also carried and driven by the shaft 25. The hub 26 as it is related to the frame A is unique and utilitarian from a servicing as well as from a sanitary point of view, in that it is not only a durable marriage of elements but is readily accessible without danger of contamination either from within or without. Further, consideration must be given to the means G to be described and which is housed within the hub 26, or in such a manner that tremendous forces can be applied to the machine without danger. To these ends, the frame bosses 19 are provided with external bearings 20' that are closely adjacent to walls 10 and 11 and which surround the bearings 20. The cup-shaped hub 26 is seated over the bearings 20' for true support from the frame A immediately adjacent the side wall thereof. As shown, the shaft 25 projects a substantial distance from the frame A (at both sides) and is provided with a selectively shiftable drive flange 27 that is rotatable and axially adjustable relative to the hub 26. The outer end of the hub 26 is closed by a wall 28 that is adjustably fixed rotatably to the flange 27, as by means of screws and a lock pin or the like. A feature of the invention is the splined engagement of the flange 27 on the shaft 25 and the provision of an axially adjustable fastener 29 comprising a threaded stud projecting from the end of the shaft 25, with a disc-shaped nut 29' rotatably engaged with the flange 27 and threadedly engaged on said stud. The nut 29' adjusts along the said stud so as to align the hub with the cam of means G, later described, and is then locked to the flange 27 by one or more screws, as shown. The wall 28 is open to pass the fastener part and said fastener includes a cap 29" that encloses the said adjustment features. In practice, the splined flange 27 slides onto the shaft 25 for driven engagement, the flange 27 has slotted openings and is rotatably adjusted to the wall 28 and fastened and pinned, and the nut 29' with a polygonal head is axially adjusted and the cap 29" applied in order to clamp the hub 26 in working position on the shaft 25.

In juicers of the type under consideration the turrets carry fruit holders to move circularly in a plane that passes a knife means and a reaming means, and to carry the holders so that they are turnable. Therefore, the turret B has a revolvable arm 30 journaled in and projecting radially from the axis of the hub 26. That is, there is a revolvable arm 30 for each fruit holder C, one or more and the same number at each turret B and each is disposed on an axis projecting radially from the axis of shaft 25. The arm 30 is a shaft-like part rotatable in bearings seated in the hub 26 and there is a seal surrounding the arm 30 where it projects from the hub 26 in the form of a lug 31 to be coupled with the fruit holder per se. The inner end of the arm 30 enters the interior of the hub 26 where it is provided with an eccentrically positioned cam follower, offset from the axis of the arm. Further, the arm 30 is tubular for accommodation of a control later described.

The fruit holders C that are releasably coupled to the turrets B by the means D are essentially cup-shaped and rigid extensions of the arms 30. The arms are revolvable as above described in order to turn the fruit holders C toward and away from the direction of movement of the turrets. Engagement of the whole fruit by the arms 30 causes it to be severed by the knife means E. The fruit holder C comprises a concaved cup 32 and a socket 33 to receive the lug 31. Additionally, and in accordance with usual practice, the fruit holder C includes opposed jaws 35 that are actuable to anchor the halved fruit in the cup 32 and to release the peel thereof after reaming. In practice, the cup is a modified hemisphere with a concavity to receive the nominal size of fruit selected for juicing and peculiarly shaped so as to turn about the reamers when moving over the same. To this end the concaved form of the cup 32 has two centers that are spaced from each other and that are together placed substantially forward of the arm axis, or inward depending upon facing of the holder C, whereby the front 36 of the cup 32 is forwardly offset (or inwardly) from the turning axis of the holder. As illustrated, the radially outward half of the concavity is centered so as to pass through or intersect the axis of the reamer F, whereas the other half of the concavity is described about a center spaced radially inward of the reamer axis. This feature which modifies the otherwise apparently hemispherical form of the cup 32 becomes necessary in passing the fruit and its peel over the reamer as later described. When the fruit holder C is faced diagonally forwardly in the direction of rotation the diameter of the cup 32 closely approaches the central longitudinal and vertically disposed plane of the juicer, and in this disposition is engageable with whole fruit to move the same forwardly. In the event that large fruit is processed, then the width or diameter of the cup 32 adequately approaches the central plane of the juicer where the whole fruit is dispensed and severed into halves by the knife means E. However, in the event that smaller fruit is processed, then cups 32 are proportionately smaller, and in accordance with the invention the front 36 of the smaller cup is increased to the nominal diameter of said larger cup, by means of a projecting rim 36′. Therefore, if the fruit holder C is diagonally revolved to an approximately 45° position the rim of the cup 32 closely approaches the central longitudinal and vertically disposed plane of the juicer.

The means D that are provided to releasably couple the fruit holders C to the turrets B are unique with the present invention and are adapted to operate easily when the juicer is jammed. For example, jamming of the juicer could occur when over-sized or hardened fruit is caught between the holder cup 32 and a reamer F. To this end, the entire fruit holder C is removable from each arm 30, being laterally displaceable from the lug 31. Thus, the socket 33 opens downwardly and laterally, opening laterally from the front 36 of the cup. The arm 30 has a shoulder 40 immediately adjacent the periphery of the hub 26, upon which the holder is slideably seated. The shoulder is in a plane normal to the axis of the arm 30 and the lug 31 is a flattened part that projects from the shoulder. Essentially, the lug 31 is key-shaped with flat sides and a semi-cylindrical wall joining the sides and said sides and wall normally engaged with comparable sides and walls of the socket 33. In accordance with the invention the lug 31 and socket 33 are keyed against axial displacement, there being a key 41 projecting from the cylindrical wall and mated with a keyway in the socket 33.

Releasable cam operated means is provided to yieldingly urge the socket 33 onto the lug 31 and which comprises a pair of first class levers 42 wherein the fulcrums 43 are between jaws 44 that grip the lug 31 and a cam 45 that powers the levers. The levers are carried at each side of the fruit holder with the jaws 44 movable to underlie the side of the lug 31 remote from the cylindrical wall thereof. The cam 45 is in the form of a double faced wedge, symetrically formed between the levers, that is operable between the powered end of the levers to spread them, as shown. Again, the cam is also a first class lever, having an operable lever arm stopped against the holder when the flats of the cam have separated the levers 42 a maximum. It will be apparent how the levers 42 are pressured so as to urge the jaws 44 into engagement with the lug 31, the jaws and lug being undercut as shown, to force the fruit holder C into tight bearing engagement upon the arm 30.

The knife means E and control therefor involves a loading tube 46, a knife 47 and a trip 48 to release whole fruit from the tube 46 and into cutting placement relative to the knife 47. The tube 46 lies over the top of the juicer and is declined to the area overlying the knife 47. The upper end of the tube is open for charging with whole fruit while the lower end is open onto a pair of laterally shiftable bars 49. The bars 49 are yieldingly urged to the parallel position shown and are geared together so as to separate in unison, upon one of them being turned by engagement of a projecting pin 50 with a pin 50′ projecting from a passing fruit holder C. The passing movement of the fruit holder is synchronized so as to operate the trip 48 to drop whole fruit one at a time into an arrested position immediately ahead of the knife 47. As shown, the knife 47 is disposed to face the forwardly moving fruit holders at or turned diagonally to each side of the central plane in order to engage with the fruit. Upon said engagement the fruit is transported by the knife 47 whereupon the separate halves of fruit are pressed into the cups 32 by widening guide rails 51, during which the cups 32 are turned so as to face the rails.

The rotatable reamers F are each associated with a turret B, there being a reamer F at each side of the frame A. The reamers are placed in the circular path of the fruit holder C and specifically in the path of the cups 32. Since considerable power is expended in the reaming function the reamers F are circumferentially spaced, one reamer being carried through a boss 52 on the wall 10 and the other on the wall 11. The two bosses 52 at opposite side walls 10 and 11 are on spaced parallel axes and each supports a main bearing 53 for rotatably supporting a reamer F. Also, the opposite wall of the frame A carried an embossment that supports a bearing 54 for rotation of the reamer. The reamers F are alike and each involves a spindle 55 rotatably journaled in the bearings 53 and 54, said spindle extending through the chamber 16 and projecting through the boss 52 at one side of the frame. As shown, the spindle 55 projects through a seal 57. Each reamer also includes a replaceable head 56 driveably threaded into the spindle 55, said head being fluted or ribbed to a semi-spherical contour simulating the interior of the fruit to be juiced. In this instance there are right and left hand threaded heads 56 for the opposite sides of the juicer, the driving action maintaining tightness of installation.

The means G controlling movements of the rotatable turrets B relative to the turnable fruit holders C is a positive acting cam 58 fixedly secured to the frame A and housed within the hub 26. It is significant that the cam 58 is fixed on the frame and operable in the rotational plane of the arms 30, and it is this fixed position of the cam which is cooperatively related to the adjustment features above described with regard to the axial as well as rotational adjustments of the hub. In accordance with the invention the cam 58 involves the control of two functions, the turning of the arms 30 on their radial axes, and the actuation of the fruit gripping jaws 35, all in coordination with revolvement of the turrets. As shown, the cam 58 is barrel-shaped with a circumferential rack 59 that shifts axially in position, and with a bottom 60 that shifts radially in position, and to the end that one cam 58 serves two functions. The track 59 comprises two side walls for guiding the eccentric cam follower 61 at the inner end of the arm 30, the track 59 having an inwardly turned portion 59a that revolves the cup 32 diagonally to face in the direction of movement, a normal portion 59b that revolves the cup 32 to face the central plane of the juicer, and a portion 59c that revolves the cup 32 to turn about the reamer F as it passes over the same, the plane of movement of the cups 32 passing through the heads of the reamers. Therefore, it is significant that the portion 59c tracks beyond the normal position of portion 59b in order to revolve the cup 32 to face diagonally rearward in order to depart from the reamer F. The bottom 60 comprises inclined portion 60a that reciprocates a push rod 62 extending through the tubular arm 30, and there is a step 60b that releases the rod 62. The inclined portion 60a is rotatably positioned to occur adjacent the portion 59b of the cam track, while the step 60b is rotatably positioned to occur after complete functioning caused by portion 59c of the cam track. The push rod 62 is biased by a return spring so that it follows the bottom 60, and is engageable with a jaw 35 to move the same into gripping contact with the halved fruit. In practice there are opposite jaws 35, each of which is of bell-crank form and one adapted to move the other. Each jaw 35 has a point that enters the cup 32 intermediate the bottom of the cup and front 36 thereof, and one of said jaws has a lever extending across the bottom of the cup, to be operated by the other jaw, and that enters the bottom of the cup to eject the peel upon release of the jaw or jaws. There is a spring return which biases the jaw or jaws 35 to a release and eject position, operable when the step 60b is reached. The inclined portion 60a of the cam 58 is operable to actuate the jaw or jaws 35 into a gripping position, as shown.

The juice finishing means H that automatically separates out the pulp and seed and which disposes of the same involves, generally, a receiver 65, an impeller 66, a screen 67, and a press plate 68. The receiver 65 is a semi-cylinder disposed on a horizontal axis at one side of the base 13 and which opens upwardly for the reception of drop through the funnel 22. The wall 18 forms the back of the receiver 65, the front being open and in communication with the cylindrical screen 67. The impeller 66 is an auger that is journaled on bearings 69 and 69' in the walls 17 and 18 with a stub shaft 66' extending through the chamber 16. The auger is of cylindrical form as it extends through the receiver 65 and is slightly conical as it extends through the screen 67, the said screen being correspondingly tapered. The forward end of the impeller 66 terminates in a flat plane normal to the axis of rotation and is spaced back from the forward end of the screen, and the press plate 68 spaced from the forward end of the impeller. In accordance with the invention, the pulp and seed is moved forwardly and forms a wad that is yieldingly urged against the press plate 68 while liquid juice is extracted through the screen 67, and the press plate is adjustably biased to resist the accumulated wad of pulp and seed. As shown, the press plate 68 is guided to float freely against the end of the screen 67, there being one or more spring arms 72 engaging the plate 68 at or above the axis of the impeller. The bias adjustment is gained by a shiftable spring anchor 70 that is selectively positioned by a screw 71, to adjustably position the spring arm or arms 72' opposite the first mentioned spring arms. Thus, the impeller forces the wad of pulp and seed against the press plate 68, and the said plate is adjustably biased to release the pulp and seed when the desired compactness and/or dryness is gained. The discharge of pulp and seed from the end of the screen 67 and laterally of the plate 68 is downward, as the end of the wad sloughs off, and is discharged through and from the bottom of the frame, continuously as the juicer operates. It is a simple matter to discharge into a garbage disposer the same as with the peel from chute 23.

With the foregoing juicer structure there is provided the drive and transmission means M which cooperatively interrelates the operation and function of the turrets B, reamers F and finishing means H, and all of the interdependent means hereinabove described. The characteristic features that are advantageously incorporated into the juicer are; the horizontal axis of the shaft 25 common to the two turrets B at opposite sides of the frame A; the horizontal spaced axis of the spindles 55 that are circumferentially spaced and which project from opposite sides of the frame A; the horizontal and laterally displaced axes of stub shaft 66' remote from the axis of shaft 25 and spindles 55 and which projects forwardly through the base 13 at one side thereof; and the provision of the chamber 16 common to all of the above mentioned drive parts 25, 55 and 66'.

As specified, the frame A is characterized by the narrow upstanding chamber 16 disposed between the closely spaced walls 10 and 11 and by the transversely disposed extension of said chamber 16 between the walls 17 and 18 of the base 13. It is within the confines of these walls to which the drive and transmission means M is limited and which involves, generally a drive shaft 80 cooperatively and directly driving the turrets B and reamers F, means 81 driving the shaft 80 and means 82 driving the finishing means H. The source of power is the drive motor 14 which is disposed on the fore and aft axis and with a motor shaft 83 projecting into the chamber 16 on the central plane of the frame A and with sprockets 84 and 85 operable in the chamber, one with the means 81 and the other with the means 82. The drive shaft 80 is parallel with the motor shaft 83 and is journaled in the chamber 16 on the central plane of the juicer and spaced from the axis of shaft 25, and with sprockets 84 and 85 operable in the chamber, one with the means 81 and the other with the means 82. As shown, the motor 14 is horizontal in which case the drive shaft 80 is horizontal and spaced below the shaft 25, there being spaced bearings 86 and 87 rotatably supporting the shaft 80 in the frame A. In accordance with the invention the drive shaft 80 directly revolves the shaft 25 at a substantially reduced rate and directly revolves the two spindles 55 at a substantially rapid rate. In the case illustrated the central portion of drive shaft 80 comprises a worm 88 that meshes with a wheel 89 keyed to shaft 25, with a gear reduction of 72 to 1; and the end portions of the drive shaft 80 inboard the bearings 86 and 87 comprise helical gears 90 and 91 that are meshed with right angularly related helical gears 92 and 93 keyed to the two reamer spindles respectively. In practice, the right angularly related helical gears 90–92 and 91–93 are matched sets of gears that drive the spindles 55 at right angles to the drive shaft 80, preferably without gear reduction. It is preferred that the axis of the spindles 55 be placed below the shaft 80 and each equidistant from the worm 88. The means of driving the drive shaft 80 receives rotation torque from the sprocket 84 and transmits it to the drive shaft, a most efficient drive means being a chain 96 as shown. The means 81 driving the shaft 80 operates advantageously at about the speed of the motor 14 in which case a sprocket 94 nearly the same size as the sprocket 84 is provided on the shaft 80 adjacent the bearing 87, each of said sprockets being of minimized diameter and comprising as few teeth as practically possible, a practical number of teeth being nine and/or ten, as shown. In practice, the motor 14 revolves at 1725 r.p.m. and the shaft 80 revolves at 1300 r.p.m., and the reamers F also revolve at 1300 r.p.m. A significant feature is the conversion from the faster 60 cycle motor 14 to a slower 50 cycle motor, in which case it is merely necessary to replace the nine tooth sprocket 84 with an eleven tooth sprocket, thereby maintaining full speed of operation. Since torque is applied in one direction only, slack on the loose side of the chain 96 is taken in by an anti-friction block 93 whereby the chamber 16 can be narrowed. The means 82 driving the stub shaft 66' receives rotational torque from the sprocket 85 and transmits it to the stub shaft, a most efficient drive means being a chain 97 as shown. The means 82 driving stub shaft 66' operates to best advantage at a reduced speed in which case a sprocket 95 of large diameter is keyed to the stub shaft, for example a twenty-eight tooth sprocket, and is driven through chain 97 by the sprocket 85, for example a nine tooth sprocket. As a result, the drive and transmission means M simultaneously operates all mechanisms of the juicer with the operation of one motor 14 through a single drive shaft 80 and the two drive chains 96 and 97 comprising the means 81 and 82.

Figure 1:
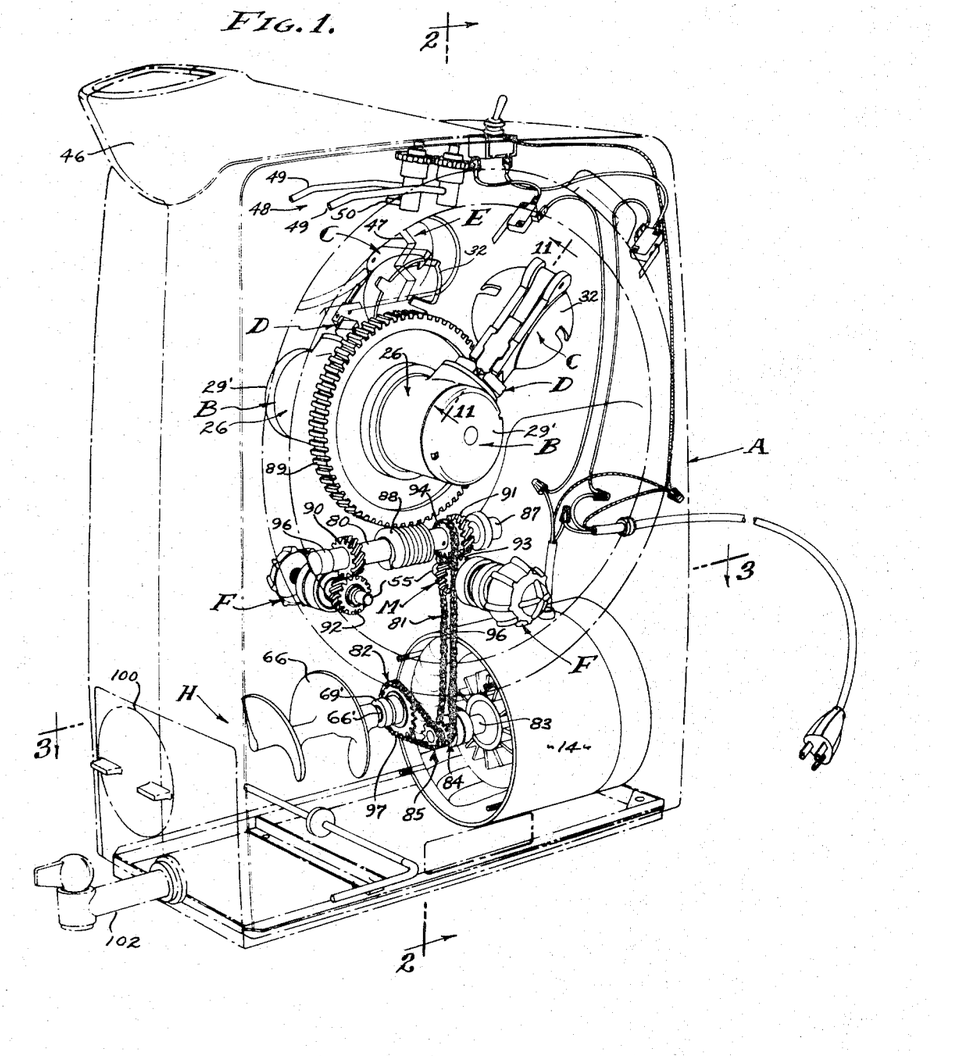
FIG. 1 is a perspective view of the juicer for citrus fruits and the like, the frame thereof being shown by phantom lines exposing the primary working parts to view.
Figure 2:
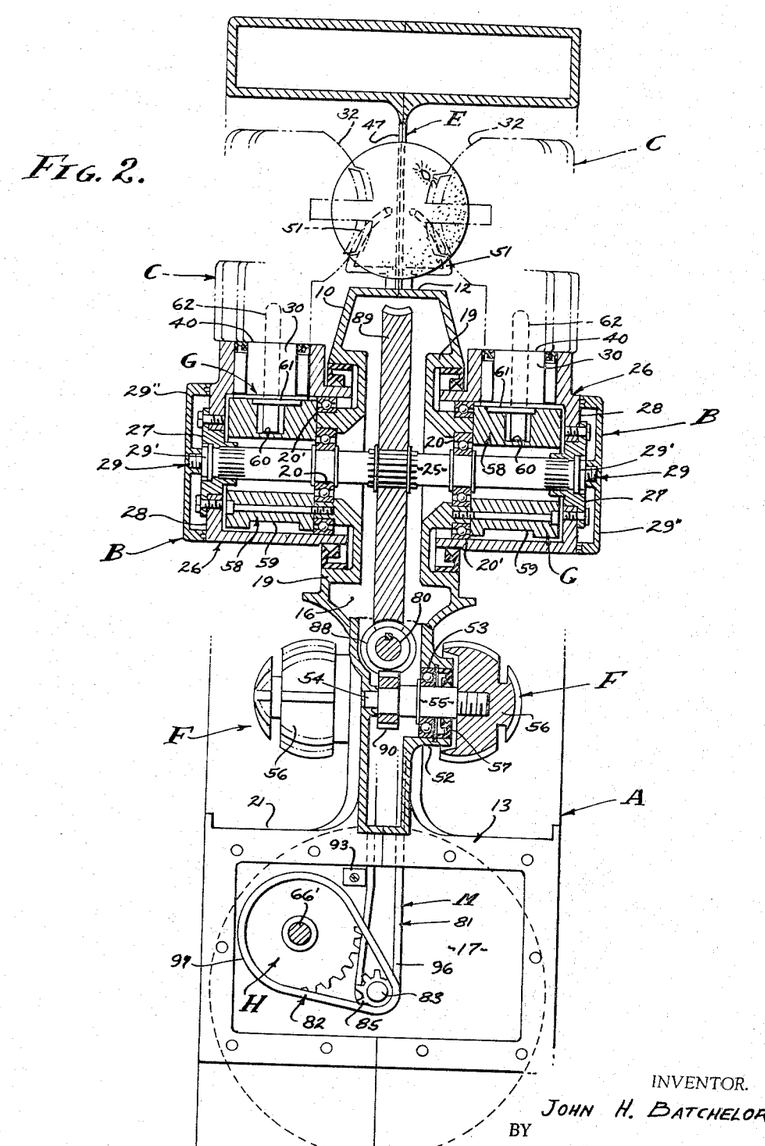
FIG. 2 is an enlarged detailed sectional view taken vertically and transversely through the juicer as indicated by line 2—2 on FIG. 1.
Figure 3:
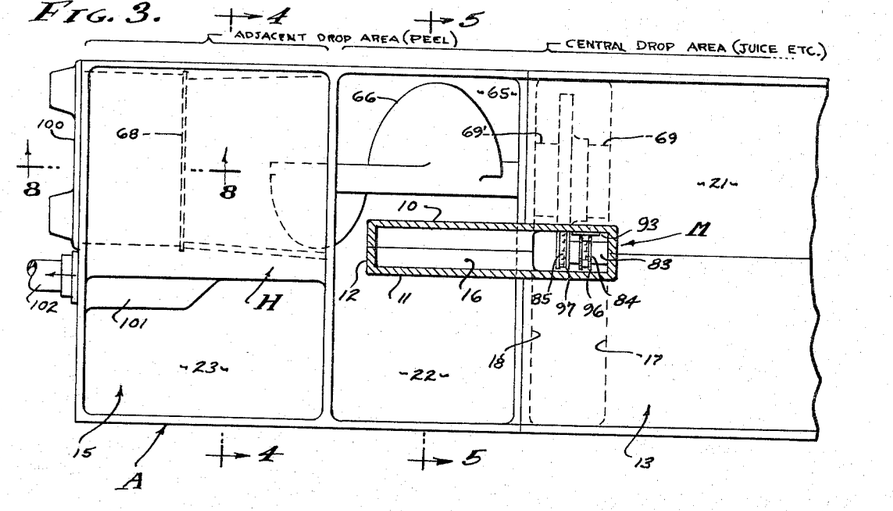
FIG. 3 is an enlarged plan section taken as indicated by line 3—3 on FIG. 1.
Figures 4, 5:
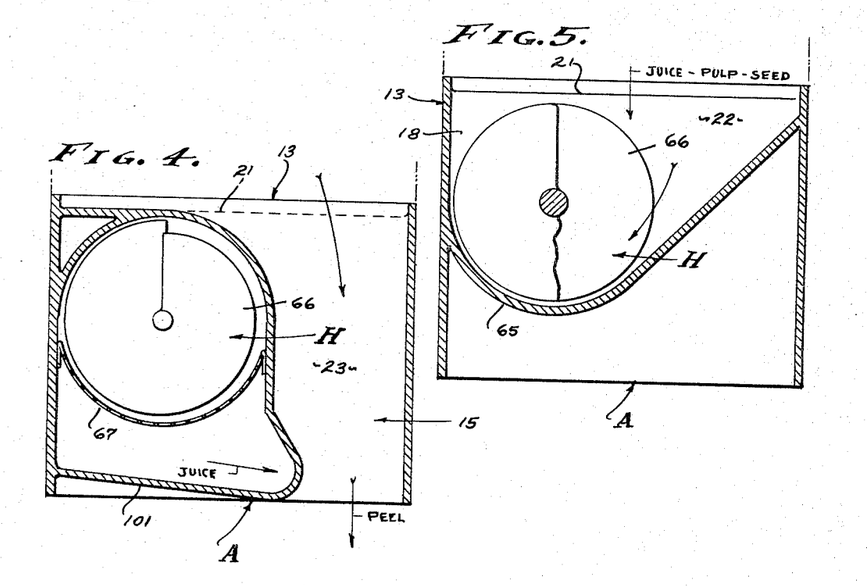
FIGS. 4 and 5 are transverse sectional views taken as indicated by lines 4—4 and 5—5 on FIG. 3.
Figures 6, 7:
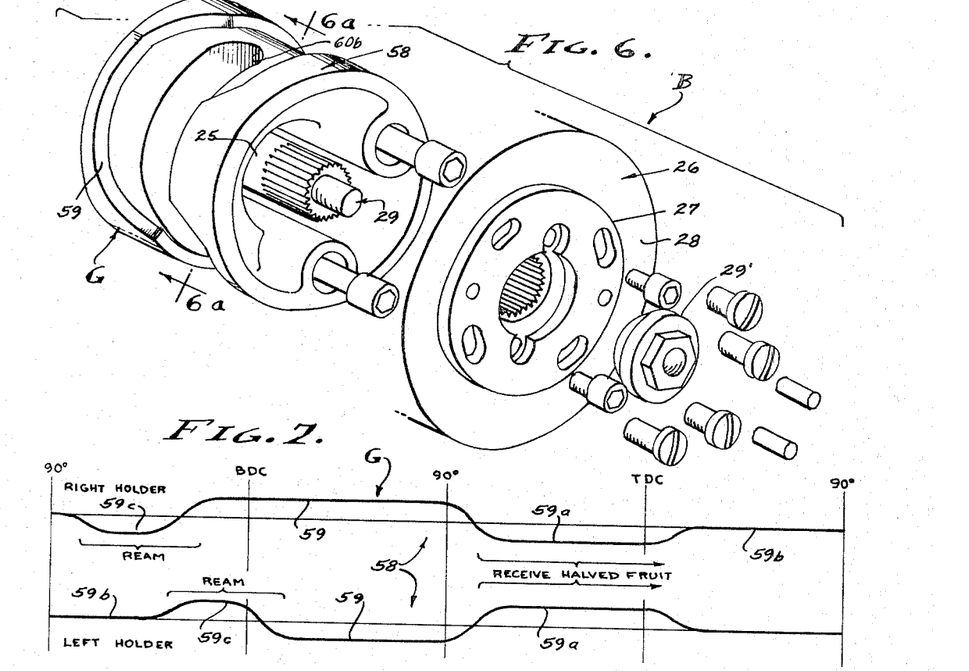
FIG. 6 is an exploded perspective view illustrating the controlling cam and hub adjustment features of the juicer.
FIG. 7 is a diagrammatic layout showing the relative movements of the two cams that are employed in the preferred embodiment of the juicer.
Figures 6A, 8, 9:
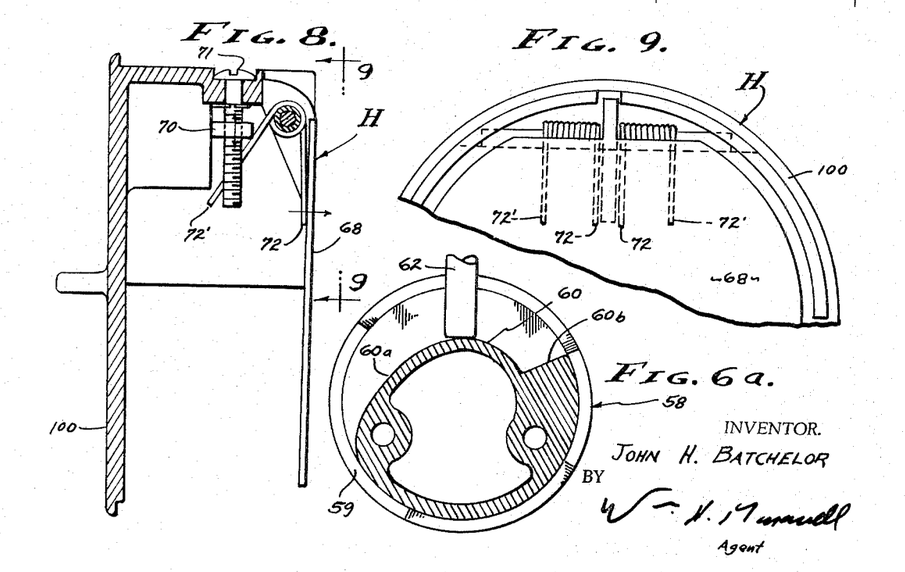
Figure 10:
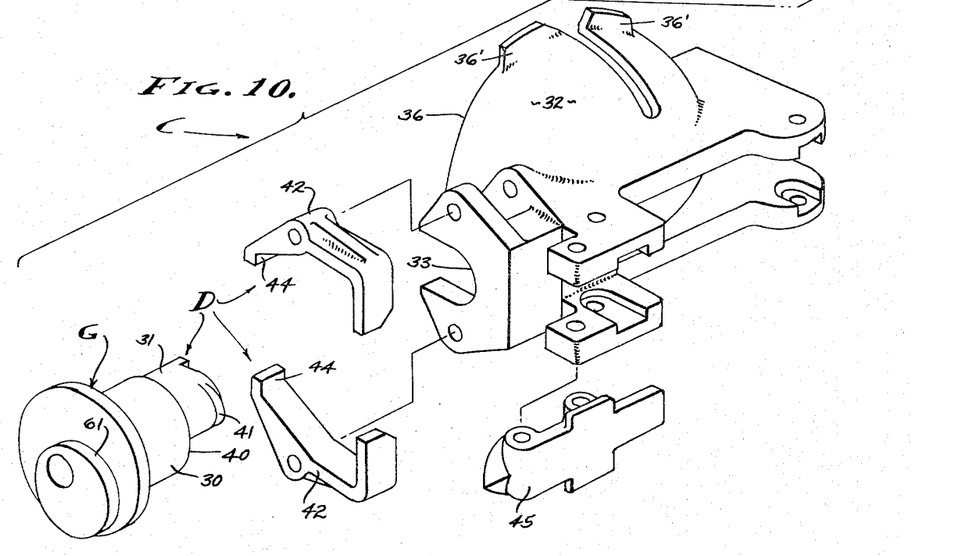
FIG. 10 is an exploded perspective view showing the parts that make up the fruit holder of the juicer, and its mounting.
Figure 11:
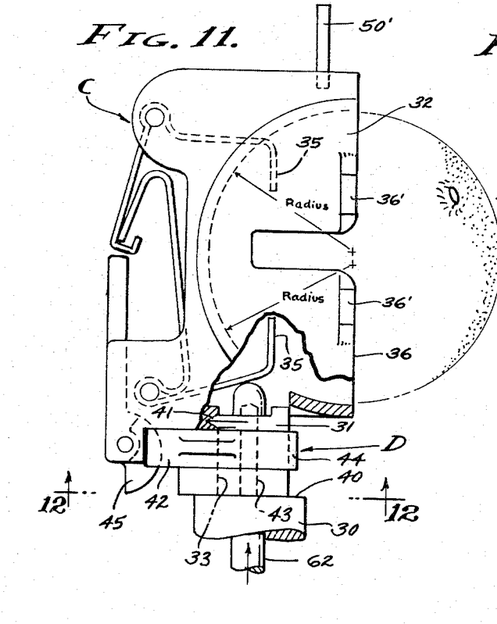
FIG. 11 is an enlarged detailed view taken substantially as indicated by line 11—11 on FIG. 1, with portions thereof broken away to show in section.
Figure 12:
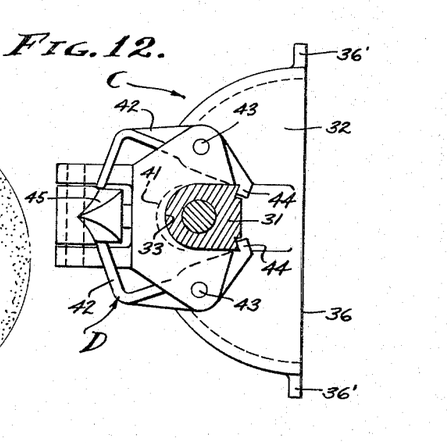
FIG. 12 is a view taken as indicated by line 12—12 on FIG. 11.

From the foregoing, the structure and function of the various features and mechanisms of the juicer will be apparent. The compactness and direct application of work that results in fully automatic extraction of juice from citrus fruits and the like are the main advantages of the machine, and the finishing means is adjustable so as to control the character of the juice. Whole fruit is inserted into the top end of the loading tube 46 (FIG. 1) and each piece of fruit is dropped individually into cutting position (FIG. 2). The rotating fruit holders C (with their widening rims 36') transport the whole fruit by the knife means E thereby halving the fruit, whereupon the means G revolves the fruit holders to an opposed position facing toward each other with the frame A therebetween, the frame A supporting the widening guide rails 51 that move the halves of fruit into the two opposite fruit holder cups. The gripping jaws 35 then bite into the peel of the fruit caused by inclined portions 60a of the cam bottoms 60 which move the rods 62 radially so as to actuate the jaws. The track 59 is engaged by the follower 61 to face the fruit holder in the direction of rotation (at about 45°) until a reamer F is reached and at which time portion 59c of the cam track turns the cup of the fruit holder during the reaming of the fruit half and after which the fruit holder faces diagonally rearward, all as above described. Having left the zone of the reamers F, the step 60b releases the grippers 35 that retract by means of spring pressure so as to drop the peels from the cups. The fruit holders are then normally positioned by the tracks 59 for the next succeeding operation. Thus, the fruit is thoroughly reamed without crushing or disturbing the peel, thereby eliminating the peel oil from the juice. The auger 66 compresses the pulp and seed against the press plate, the pressure advantageously exerted by the press plate being utilized to selectively control the dryness of the pulp. In the case illustrated, the strainer or screen comprises the lower half of the tube in which the auger operates, and the amount of pulp passed by the screen is predetermined by the dryness of pulp that is accumulated in the form of a wad or plug that is released by the said press plate. As shown in FIG. 1 the finisher is a removable unit of construction which comprises a door 100 in the front face of the juicer and which is readily removed for access and cleaning of the finisher and screen, and a sump 101 to drain toward a faucet 102.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. In a juicer for citrus fruits and the like:
   (a) a narrow upstanding frame having closely related oppositely faced side walls;
   (b) a single shaft journaled in the frame and projecting from the opposite side walls thereof;
   (c) a pair of turrets and each revolvably carried by the said shaft at opposite sides of the frame;
   (d) at least one cup-shaped fruit holder carried by each turret and normally facing the first mentioned walls of the frame, and said fruit holders being rotatably aligned to move together in circular paths described at opposite sides of a median plane disposed centrally through the frame, said paths being in parallel planes;
   (e) means carried by the frame and related to the rotation of the two turrets for selectively turning the fruit holders on their respective axes which are radially disposed in said circular paths;
   (f) knife means having a cutting edge disposed on said median plane for halving whole fruit placed on said median plane and in the circular paths of the fruit holders, said fruit holder turning means causing the said fruit holders to turn to said normal positions to separately receive the halves of fruit;
   (g) a pair of convexly formed reamers and each revolvably journaled at an opposite side of the frame and each positioned adjacent to the circular path of a fruit holder for reaming the halves of fruit carried by each holder, said fruit holder turning means causing the said fruit holders to turn around the reamers while passing over the same;
   (h) means for collecting the drop of juice and for disposing of the pulp, seed and peel;
   (i) and driving means for revolving the turrets and reamers.

2. In a juicer for citrus fruits and the like:
   (a) a frame comprising closely spaced upstanding walls joined by a transverse wall forming a narrow chamber therein;
   (b) a single shaft journaled in the two upstanding walls respectively, projecting through the chamber and from opposite sides of the frame;
   (c) a pair of turrets and each revolvably carried by the said shaft at opposite sides of the frame;
   (d) at least one cup-shaped fruit holder carried by each turret and normally facing the first mentioned walls of the frame, and said fruit holders being rotatably aligned to move together in circular paths described at opposite sides of a median plane disposed centrally through the above said chamber, said paths being in parallel planes;
   (e) means carried by the frame and related to the rotation of the two turrets for selectively turning the fruit holders on their respective axes which are radially disposed in said circular paths;
   (f) knife means having a cutting edge disposed on said median plane for halving whole fruit placed on said median plane and in the circular paths of the fruit holders, said fruit holder turning means causing the said fruit holders to turn to said normal positions to separately receive the halves of fruit;
   (g) a pair of convexly formed reamers and each revolvably journaled at an opposite side of the frame and each positioned adjacent to the circular path of a fruit holder for reaming the halves of fruit carried by each holder, said fruit holder turning means causing the said fruit holders to turn around the reamers while passing over the same;
   (h) means for collecting the drop of juice and for disposing of the pulp, seed and peel;
   (i) and driving means housed in said chamber for revolving the turrets and reamers.

3. In a juicer for citrus fruits and the like:
   (a) a frame comprising closely spaced upstanding walls joined by a transverse wall forming a narrow chamber therein;

(b) a single shaft journaled in the two upstanding walls respectively, projecting through the chamber and from opposite sides of the frame;

(c) a pair of turrets and each revolvably carried by the said shaft at opposite sides of the frame;

(d) at least one cup-shaped fruit holder carried by each turret and normally facing the first mentioned walls of the frame, and said fruit holders being rotatably aligned to move together in circular paths described at opposite sides of a median plane disposed centrally through the above said chamber, said paths being in parallel planes;

(e) means carried by the frame and related to the rotation of the two turrets for selectively turning the fruit holders on their respective axes which are radially disposed in said circular paths;

(f) knife means having a cutting edge disposed on said median plane for halving whole fruit placed on said median plane and in the circular paths of the fruit holders, said fruit holder turning means causing the said fruit holders to turn to said normal positions to separately receive the halves of fruit;

(g) a pair of convexly formed reamers and each revolvably journalled at an opposite side of the frame and each positioned adjacent to the circular path of a fruit holder for reaming the halves of fruit carried by each holder, said fruit holder turning means causing the said fruit holders to turn around the reamers while passing over the same;

(h) means for collecting the drop of juice and for disposing of the pulp, seed and peel;

(i) and driving means comprising a drive shaft journaled in the frame within the housing and geared directly to the first mentioned single shaft and directly to the two reamers, said drive shaft being rotated by a prime mover.

4. In a juicer for citrus fruits and the like:
(a) a frame comprising closely spaced upstanding walls joined by a transverse wall forming a narrow chamber therein;

(b) a single shaft journaled in the two upstanding walls respectively, projecting through the chamber and from opposite sides of the frame;

(c) a pair of turrets and each revolvably carried by the said shaft at opposite sides of the frame;

(d) at least one cup-shaped fruit holder carried by each turret and normally facing the first mentioned walls of the frame, and said fruit holders being rotatably aligned to move together in circular paths described at opposite sides of a median plane disposed centrally through the above said chamber, said paths being in parallel planes;

(e) means carried by the frame and related to the rotation of the two turrets for selectively turning the fruit holders on their respective axes which are radially disposed in said circular paths;

(f) knife means having a cutting edge disposed on said median plane for halving whole fruit placed on said median plane and in the circular paths of the fruit holders, said fruit holder turning means causing the said fruit holders to turn to said normal positions to separately receive the halves of fruit;

(g) a pair of convexly formed reamers and each revolvably journaled at an opposite side of the frame and each positioned adjacent to the circular path of a fruit holder for reaming the halves of fruit carried by each holder, said fruit holder turning means causing the said fruit holders to turn around the reamers while passing over the same;

(h) means for collecting the drop of juice and for disposing of the pulp, seed and peel;

(i) and driving means comprising a drive shaft journaled in the frame within the housing, and on said median plane, and geared directly to the first mentioned single shaft and directly to the two reamers, said drive shaft being rotated by intermeshing means extended radially of the single shaft and through the chamber to a prime mover axis disposed centrally of the frame.

5. In a juicer for citrus fruits and the like:
(a) a frame with upstanding walls disposed closely together at a longitudinally disposed median plane, and with a horizontally disposed base underlying the walls and supporting the same, there being a centrally located juice, pulp and seed drop area and there being a peel drop area adjacent thereto in the base;

(b) a single shaft journaled in the frame and projecting from the opposite side walls thereof;

(c) a pair of turrets and each revolvably carried by the said shaft at opposite sides of the frame;

(d) at least one cup-shaped fruit holder carried by each turret and normally facing the first mentioned walls of the frame, and said fruit holders being rotatably aligned to move together in circular paths described at opposite sides of a median plane disposed centrally through the frame, said paths being in parallel planes;

(e) means carried by the frame and related to the rotation of the two turrets for selectively turning the fruit holders on their respective axes which are radially disposed in said circular paths;

(f) knife means having a cutting edge disposed on said median plane for halving whole fruit placed on said median plane and in the circular paths of the fruit holders, said fruit holder turning means causing the said fruit holders to turn to said normal positions to separately receive the halves of fruit;

(g) a pair of convexly formed reamers disposed above said central drop area and each revolvably journaled at an opposite side of the frame and each positioned adjacent to the circular path of a fruit holder for reaming the halves of fruit carried by each holder, said fruit holder turning means causing the said fruit holders to turn around the reamers while passing thereover to extract juice, pulp and seed which fall into said underlying central drop area;

(h) means operable after the above extraction of juice, pulp and seed to release the peels out of the fruit holders so as to fall into said underlying adjacent drop area;

(i) and driving means for revolving the turrets and reamers.

6. In a juicer for citrus fruits and the like:
(a) a frame with upstanding walls disposed closely together at a longitudinally disposed median plane, and with a horizontally disposed base underlying the walls and supporting the same, there being a centrally located juice, pulp and seed drop area and there being a peel drop area adjacent thereto in the base;

(b) a single shaft journaled in the frame and projecting from the opposite side walls thereof;

(c) a pair of turrets and each revolvably carried by the said shaft at opposite sides of the frame;

(d) at least one cup-shaped fruit holder carried by each turret and normally facing the first mentioned walls of the frame, and said fruit holders being rotatably aligned to move together in circular paths described at opposite sides of a median plane disposed centrally through the frame, said paths being in parallel planes;

(e) means carried by the frame and related to the rotation of the two turrets for selectively turning the fruit holders on their respective axes which are radially disposed in said circular paths;

(f) knife means having a cutting edge disposed on said median plane for halving whole fruit placed on said median plane and in the circular paths of the fruit holders, said fruit holder turning means causing the said fruit holders to turn to said normal positions to separately receive the halves of fruit;

(g) a pair of convexly formed reamers disposed above said central drop area and each revolvably journaled at an opposite side of the frame and each positioned adjacent to the circular path of a fruit holder for reaming the halves of fruit carried by each holder, said fruit holder turning means causing the said fruit holders to turn around the reamers while passing thereover to extract juice, pulp and seed which fall into said underlying central drop area;

(h) means offset to one side of the median plane and communicating with said central drop area in the base to finish the juice by removing the pulp and seed therefrom, and means offset to the other side of the median plane and communicating with said adjacent drop area in the base to receive the peels that fall from the fruit holders following said extraction;

(i) and driving means for revolving the turrets and reamers.

7. In a juicer for citrus fruits and the like:

(a) a frame with upstanding walls disposed closely together at a longitudinally disposed median plane, and with a horizontally disposed base underlying the walls and supporting the same, there being a centrally located juice, pulp and seed drop area and there being a peel drop area adjacent thereto in the base;

(b) a single shaft journaled in the frame and projecting from the opposite side walls thereof;

(c) a pair of turrets and each revolvably carried by the said shaft at opposite sides of the frame;

(d) at least one cup-shaped fruit holder carried by each turret and normally facing the first mentioned walls of the frame, and said fruit holders being rotatably aligned to move together in circular paths described at opposite sides of a median plane disposed centrally through the frame, said paths being in parallel planes;

(e) means carried by the frame and related to the rotation of the two turrets for selectively turning the fruit holders on their respective axes which are radially disposed in said circular paths;

(f) knife means having a cutting edge disposed on said median plane for halving whole fruit placed on said median plane and in the circular paths of the fruit holders, said fruit holder turning means causing the said fruit holders to turn to said normal positions to separately receive the halves of fruit;

(g) a pair of convexly formed reamers disposed above said central drop area and each revolvably journaled at an opposite side of the frame and each positioned adjacent to the circular path of a fruit holder for reaming the halves of fruit carried by each holder, said fruit holder turning means causing the said fruit holders to turn around the reamers while passing thereover to extract juice, pulp and seed which fall into said underlying central drop area;

(h) means comprising a funnel from said central drop area and communicating with a finishing auger journaled in the base to revolve and transport pulp and seed within and toward one end portion of a screen, said auger terminating short of said one end of the screen, and there being a press plate normally closing the said one end of the screen and biased thereagainst by selectively adjustable spring arms so as to release pulp and seed that is accumulated ahead of the auger and against said press plate;

(i) and driving means for rotating the turrets, reamers and the said finishing auger.

8. In a juicer for citrus fruits and the like:

(a) an upstanding frame having a laterally faced side wall;

(b) a rotated horizontally disposed shaft projecting from the wall and having a turret thereon with at least one cup-shaped fruit holder turnable on an axis radial to the rotated shaft to move in a circular path spaced from the side wall of the frame;

(c) a rotated convexly formed reamer projecting from the wall to continuously revolve and in said circular path of the fruit holder for reaming halves of fruit carried by the holder;

(d) means carried by the frame and related to the rotation of the turret for selectively turning the fruit holder on its radial axis, to face the reamer on its approach thereto and to turn around the reamer while passing thereover and to face the reamer on its departure therefrom;

(e) and said cup-shaped fruit holder having a recess, said recess being defined by an upper concaved portion having a radius movable through a position substantially concentric with the center of the convex reamer and a lower concaved portion having a radius offset radially inward toward the rotated shaft for clearing and facilitating discharge of the fruit peel.

9. The juicer as set forth in claim 2, and wherein the driving means comprises, a drive shaft journaled in the frame within and between the upstanding walls, and a rotating worm meshed with a wheel rotating the first mentioned single shaft, said drive shaft rotating right angularly rotated gears meshed to rotate the two reamers respectively, and said drive shaft being rotated by a prime mover.

10. The juicer as set forth in claim 2, and wherein the driving means comprises, a drive shaft journaled in the frame within and between the upstanding walls, and a rotating worm meshed with a speed reducing wheel rotating the first mentioned single shaft, said drive shaft rotating two like sets of right angularly related gears meshed to rotate the two reamers which are thereby spaced circumferentially relative to the circular paths of the fruit holders, and said drive shaft being rotated by a prime mover.

11. The juicer as set forth in claim 2, and wherein the driving means comprises, a drive shaft journaled in the frame within and between the upstanding walls, and on said median plane, and geared directly to the first mentioned single shaft and directly to the two reamers, said drive shaft being rotated by a transmission chain extended radially of said single shaft and through the narrow chamber of the frame and to a prime mover sprocket displaced from the circular paths of the fruit holders.

12. The juicer as set forth in claim 5, and wherein the frame includes a funnel from the juice, pulp and seed drop area, said funnel being disposed toward one side of the median plane and communicating with a finisher that removes pulp and seed, and wherein the frame includes a chute from the said adjacent peel drop area, said chute being disposed toward the other side of the median plane and discharging from the base of the frame to pass the peels that are released from the fruit holders.

13. The juicer as set forth in claim 5, and wherein the frame includes a funnel from the juice, pulp and seed drop area, said funnel being disposed toward one side of the median plane and communicating with a finishing auger journaled in the base of the frame to revolve within a screen to separately discharge juice and to remove pulp and seed, and wherein the frame includes a chute from said adjacent peel drop area, said chute being disposed toward the other side of the median plane and opening from the base of the frame to pass the peels that are released.

14. The juicer as set forth in claim 5, and wherein the frame includes a funnel from the juice, pulp and seed drop area, said funnel being disposed toward one side of the median plane and communicating with a finishing auger journaled in the base to revolve and transport pulp and seed toward one end of a screen, there being a press plate biased against said one end of the screen and movable therefrom to release accumulated pulp and seed, and wherein the frame includes a chute from said adjacent peel drop area, said chute being disposed toward the other side of the median plane and opening from the base of the frame to pass the peels that are released from the fruit holders.

15. The juicer as set forth in claim 5, and wherein the frame includes a funnel from the juice, pulp and seed drop area and communicating with a finishing auger journaled in the base to revolve and transport pulp and seed within and toward one end portion of a screen, said auger terminating short of said end of the screen, and there being a press plate normally closing the said one end of the screen and selectively adjustable spring arms biased against the press plate at and above the center thereof so as to be movable from the end of the screen and to release pulp and seed downwardly as it accumulates ahead of the auger and against said press plate.

References Cited
UNITED STATES PATENTS

| | | | |
|---|---|---|---|
| 2,753,904 | 7/1956 | Trainor | 146—3 |
| 3,154,122 | 10/1964 | Batchelor et al. | 146—3 |

WILLIAM W. DYER, Jr., *Primary Examiner.*

W. GRAYDON ABERCROMBIE, *Examiner.*